(12) United States Patent
Wong et al.

(10) Patent No.: US 7,369,510 B1
(45) Date of Patent: May 6, 2008

(54) WIRELESS LAN USING RSSI AND BER PARAMETERS FOR TRANSMISSION RATE ADAPTATION

(75) Inventors: Michael S. Y. Wong, Sunnyvale, CA (US); Jeffrey M. Gilbert, Sunnyvale, CA (US); Craig H. Barratt, Redwood City, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 671 days.

(21) Appl. No.: 10/809,287

(22) Filed: Mar. 24, 2004

Related U.S. Application Data

(63) Continuation-in-part of application No. 10/139,935, filed on May 6, 2002.

(51) Int. Cl.
*H04L 1/00* (2006.01)

(52) U.S. Cl. .............. 370/252; 370/333; 370/458; 370/252; 370/352; 370/465

(58) Field of Classification Search ............ 370/333, 370/458, 252, 465, 352, 356
See application file for complete search history.

(56) References Cited

U.S. PATENT DOCUMENTS

| | | | |
|---|---|---|---|
| 5,638,408 | A | 6/1997 | Takaki |
| 6,535,523 | B1 | 3/2003 | Karmi et al. |
| 6,549,759 | B2 | 4/2003 | Arviv et al. |
| 6,728,217 | B1 | 4/2004 | Amirijoo et al. |
| 6,757,255 | B1 | 6/2004 | Aoki et al. |
| 6,760,313 | B1 * | 7/2004 | Sindhushayana et al. .... 370/252 |
| 6,912,204 | B2 * | 6/2005 | Kossi et al. ............... 370/252 |
| 6,947,387 | B1 | 9/2005 | Saw |
| 6,985,437 | B1 * | 1/2006 | Vogel ....................... 370/230 |
| 6,985,453 | B2 | 1/2006 | Lundby et al. |
| 7,127,654 | B2 * | 10/2006 | Jalali et al. ................. 714/748 |
| 2002/0062472 | A1 | 5/2002 | Medlock et al. |
| 2002/0133584 | A1 | 9/2002 | Greuel et al. |
| 2002/0197999 | A1 | 12/2002 | Wu et al. |
| 2003/0021243 | A1 | 1/2003 | Hamalainen |
| 2003/0133422 | A1 * | 7/2003 | Bims ......................... 370/328 |
| 2005/0118958 | A1 * | 6/2005 | Alexiou ................... 455/67.11 |
| 2006/0067278 | A1 | 3/2006 | Li et al. |
| 2006/0094367 | A1 * | 5/2006 | Miyoshi et al. .......... 455/67.11 |

\* cited by examiner

*Primary Examiner*—Rafael Perez-Gutierrez
*Assistant Examiner*—Julio Perez
(74) *Attorney, Agent, or Firm*—Bever, Hoffman & Harms, LLP; Jeanette S. Harms

(57) ABSTRACT

Dynamic conditions present in a channel can quickly degrade signal quality, thereby reducing the data rate usable by a WLAN transmitter. For maximum throughput, the highest, reliable data rate available should be used. In accordance with one feature of an adaptive rate technique, a lookup RSSI from one or more acknowledgment packets can be determined. One or more valid data rates can then be determined, wherein a valid data rate has an RSSI threshold less than or equal to the lookup RSSI. An achievable throughput can be computed for each valid data rate based on a theoretical rate and a packet error rate (PER). The valid data rate having the highest achievable throughput can be chosen as the new transmission rate. A rate control table, which can include RSSI thresholds, UDP rates, and PERs for each supported data rate, can be updated based on actual transmission information.

37 Claims, 4 Drawing Sheets

WIRELESS LAN USING RSSI AND BER PARAMETERS FOR TRANSMISSION RATE ADAPTATION

RELATED APPLICATION

This application is a continuation-in-part of U.S. patent application Ser. No. 10/139,935, entitled "Wireless LAN Using Transmission Monitoring", filed on May 6, 2002, and incorporated by reference herein.

BACKGROUND OF THE INVENTION

1. Field of the Invention

The invention relates to the field of networks and particularly to a wireless local area network (WLAN) transmitter.

2. Description of the Related Art

Many devices currently have the capability to communicate without the use of a wired network. Such devices can include, for example, laptops and personal digital assistants (PDAs). These devices can use a wireless local area network (LAN), which can operate separately from or operate in conjunction with an existing wired network.

Although wireless communication typically involves only one transmitter, various communication modes can involve different numbers of receivers. For example, a unicast transmission is a transmission from one transmitter to one specified receiver. In contrast, a broadcast transmission is a transmission from one transmitter to all receivers in a given area, whereas a multicast transmission is a transmission from one transmitter to a specified group of multiple receivers. Note that a transmitter (or a receiver) could be an access point or a client in accordance with standard characterizations. The term "station", as used herein, can generically refer to either a transmitter or a receiver.

In wireless communication, messages can be transmitted as packets of data over a channel, wherein a packet has a header (e.g. including the transmitter's and receiver's addresses) as well as data. Note that the channel can be defined by one or more characteristics (e.g. a frequency and/or a modulation scheme). In packet switching, the transmitter transmits each packet individually over the channel to its destination.

For example, FIG. 1 illustrates a transmitter 110 transmitting multiple streams of communication 111, 112, and 113 over a channel 130 to a receiver 120. In one embodiment, these multiple streams of communication 111, 112, and 113 could provide different applications, e.g. video, data, and audio, thereby requiring separate queuing for each stream to ensure quality of service (QoS). In FIG. 1, each of the streams of communication 111, 112 and 113 transmitted over channel 130 may have multiple packets being transmitted, with the packets illustrated closest to the receiver 120 being received first in time. For example, a communication 100 could comprise a plurality of serially-transmitted packets 101-107, wherein communication stream 111 includes video packets 101-103 in sequence, communication stream 112 includes data packets 104-106 in sequence, and communication stream 113 includes an audio packet 107.

Many wireless communication schemes, such as those based on the IEEE 802.11 standards (including the IEEE 802.11a, 802.11b, and 802.11g standards), can be implemented using a range of data rates. For example, the IEEE 802.11b standard enables data rates from 1 Mbps to 11 Mbps, whereas the IEEE 802.11a standard enables data rates from 6 Mbps to 54 Mbps. Due to various features of the encoding schemes dictated by many such wireless communication standards, transmission on a channel is generally established at a selected available data rate within an available set of rates.

For example, depending on channel conditions, reliable communication in compliance with the IEEE 802.11a standard may take place at 6 Mbps, 9 Mbps, 12 Mbps, 18 Mbps, 24 Mbps, 36 Mbps, 48 Mbps, and 54 Mbps. In a similar manner, the IEEE 802.11b standard includes data rates of 1 Mbps, 2 Mbps, 5.5 Mbps, and 11 Mbps. The IEEE 802.11g standard can support rates from both 802.11a and 802.11b. Note that other intermediate, slower, or faster data rates may be possible either currently or in the future. Thus, the embodiments herein using specific data rates are illustrative only and not limiting.

Lower data rates typically allow for more reliable transmissions in challenging environments, e.g. noisy, distant, or otherwise flawed channels. Higher data rates can be used across ideal or nearly ideal channels. As used herein, the term data rate refers to the amount of information that can be successfully transmitted by transmitter 110 in a given time period. The data rate may be disadvantageously reduced due to signal degradation in channel 130. As more signal degradation occurs, the receiving device of receiver 120 may only be able to receive accurately data transmitted more slowly, thus requiring more time to transfer the same amount of data. Because the transmitting device and the receiving device are set to the same data rate, the lower the data rate of the transmitting device the more time the receiving device has to read the data. However, for maximum throughput, it is desirable to determine the highest, reliable data rate available.

Unfortunately, dynamic conditions present in the channel can degrade signal quality. For example, one reason for signal degradation is shadow fading, wherein objects near either the transmitter or the receiver (e.g. walls, people, cars) can block the signal. Another reason for signal degradation is distance-dependent path loss, wherein the signal experiences a reduction of power with increasing distance. Another reason for signal degradation is multi-path propagation, wherein echoes of a single signal (e.g. caused by reflection) can result in the superposition of that signal. Yet another reason for signal degradation is interference, wherein other signals in the vicinity of a first signal can interfere with that first signal, thereby degrading its quality. Note that these other signals could be from either 802.11 compliant devices that are too far away to know to be quiet, but close enough to affect a given signal when they transmit, or from non-compliant devices (e.g. devices using different standards).

Current schemes fail to effectively account for these dynamic changes in the channel. For example, in one scheme, a system administrator can determine (or at least estimate) the distance between stations and set the data rate according to this distance. In other words, if the stations are close together, then the data rate can be set relatively high as the likelihood of signal degradation is low. In contrast, if the stations are far apart, then the data rate can be set relatively low as the likelihood of signal degradation is high. Unfortunately, this scheme fails to take into account actual channel conditions, which can vary significantly irrespective of distance between stations.

In another scheme, if the packet error rate (i.e. the number of packets that fail to reach the receiver divided by the total number of packets sent by the transmitter) exceeds a predetermined threshold, then the data rate for subsequent packets could be adjusted to the next lower data rate. In contrast, if the packet error rate falls below another predetermined threshold, then the data rate for subsequent packets could be adjusted to the next higher data rate. These predetermined thresholds provide a sub-optimal solution that worsens with the number of available data rates. In other words, for a limited number of data rates, the fixed thresholds based on packet error rate provide a rough, but relatively reasonable indication of when to change to another data rate. However, in current systems where numerous data rates are available, the fixed thresholds based on packet error rate can become too rough for meaningful adjustment of the data rate. Also, this scheme is too slow for adapting in an indoor, multipath environment that has quickly changing channel conditions.

Therefore, a need arises for a system and method of automatically optimizing utilization of the wireless channel.

SUMMARY OF THE INVENTION

Dynamic conditions present in a channel can quickly degrade signal quality, thereby reducing the data rate usable by a WLAN transmitter. For maximum throughput in a WLAN transmitter, it is desirable to determine the highest, reliable data rate available. Current rate setting techniques fail to effectively account for these dynamic changes in the channel.

In accordance with one feature of an adaptive rate technique in a WLAN transmitter, a lookup received signal strength indicator (RSSI) from multiple acknowledgement (ACK) packets can be determined. For example, determining the lookup RSSI could include determining a median value of RSSIs from three ACK packets. One or more valid data rates from a group of supported data rates can then be determined, wherein a valid data rate has an RSSI threshold less than or equal to the lookup RSSI.

An achievable user throughput can be computed for each valid data rate based on a theoretical UDP rate and a packet error rate (PER). The UDP rate, a universal datagram protocol transmission rate measured in Mb/s, refers to a "burdened" network throughput. That is, each packet transmission has an associated overhead as defined, for example in RFC 768. This overhead may include waiting for an ACK packet and sending non-data, such as a header, in the packet. Therefore, a UDP rate is less than its associated data rate. The PER can be expressed equivalently as a fraction or a percentage. In one embodiment, computing the achievable user throughput could include computing a product of the theoretical UDP rate and 1−PER. The valid data rate having the highest achievable user throughput can be chosen as the new transmission rate (TxRate).

The adaptive rate technique can further include determining if a size of the frame to be transmitted is greater than a predetermined value. If the size is greater than this predetermined value, then the lookup RSSI can be reduced by a predetermined amount before determining the valid data rates. In one embodiment, the lookup RSSI can also be biased based on age before determining valid data rates. For example, an older lookup RSSI can be reduced more than a more recent lookup RSSI.

The adaptive rate technique can further include determining whether the optimal data rate is greater than a maximum data rate (maxRate), which refers to the maximum currently successful transmission rate that can be used for a regular transmission. If the TxRate is greater than the maxRate, then the technique can determine whether a probe rate is appropriate. In accordance with one feature of the invention, a probe rate can be periodically used on a single packet to test a high data rate, thereby allowing a rapid data rate increase should probing be successful. If the probe rate is successful, then the TxRate can be reset to one rate higher than the maxRate. A probe rate is appropriate if the frame sent at the probe rate is transmitted successfully in one or two attempts. If the probe rate is not appropriate, then the TxRate can be reset to the maxRate.

The adaptive rate technique can further include updating a rate control table based on actual transmission information. Updating the rate control table can be based on a number of retries to successfully transmit a packet at the TxRate. For example, if excessive retries are performed, then the PER and the RSSI threshold of the TxRate can be adjusted.

Updating the rate control table can be further based on whether the TxRate is a probe rate. If the TxRate is not a probe rate and the PER is greater than a predetermined value, then the rate control table can be updated to ensure that data rates above the TxRate have higher RSSI thresholds than that of the TxRate. The rate control table can further be updated to ensure that data rates below the TxRate have lower RSSI thresholds than that of the TxRate as well as PERs less than or equal to the PER of the TxRate. In this manner, actual transmission information from the TxRate can be used to predict more accurate non-TxRate parameter values.

Even if excessive retries are not performed using the TxRate, then the rate control table can be updated based on the number of retries. For example, if the TxRate is a probe rate and has few retries, then the PER of the TxRate can be reset, a probe interval can be significantly reduced, and the maxRate can be set to the probe rate. In one embodiment, if the TxRate is not a probe rate and has no retries on a predetermined number of packets sent at TxRate, then the RSSI threshold of the TxRate can be reduced.

If the TxRate is not a probe rate and the PER is greater than a predetermined value, then the rate control table can be updated to ensure that data rates above the TxRate have higher RSSI thresholds than that of the TxRate. The rate control table can further be updated to ensure that data rates below the TxRate have lower RSSI thresholds than that of the TxRate as well as PERs less than or equal to the PER of the TxRate.

In one embodiment, updating the rate control table can include periodically aging parameter values. Aging values can include reducing RSSI thresholds by a predetermined amount and reducing PERs by a predetermined factor.

The adaptive rate technique can be implemented using a computer-implemented program. Specifically, the computer-implemented program can determine the TxRate in the WLAN transmitter. The computer-implemented program can advantageously include instructions for performing the above-described steps.

DETAILED DESCRIPTION OF THE FIGURES

Figure 1:
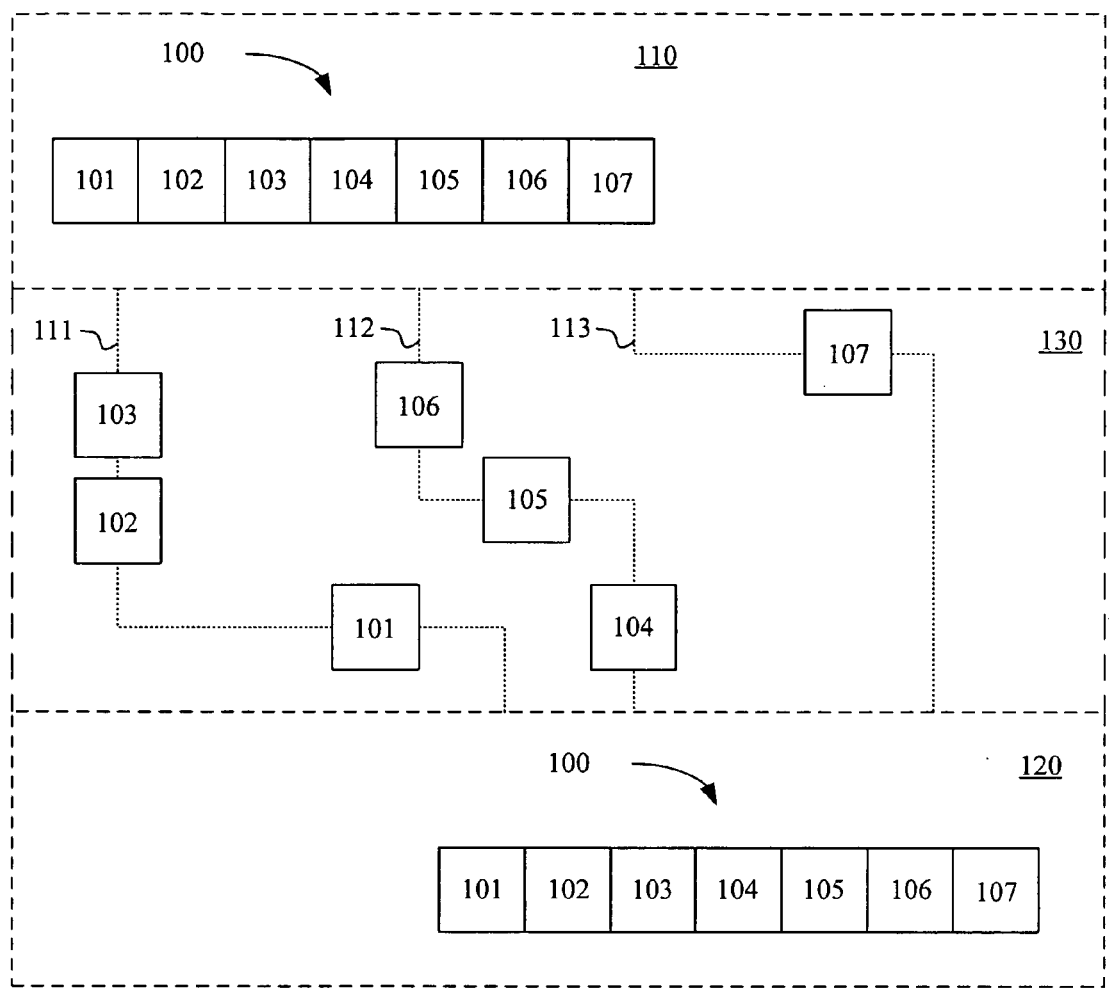
FIG. 1 illustrates a transmitter transmitting multiple streams of communication over a channel to a receiver.

In an ideal system, every transmission of a packet in a channel would be sent at an optimum rate. However, this optimum rate changes constantly due to the dynamic nature of channel conditions. Therefore, in accordance with one aspect of the invention, the data rate of any communication, communication stream, and/or packet (herein referred to as a packet) can be adapted based on certain stored parameters.

In one embodiment, a transmitter can analyze a feedback signal routinely sent by the receiver after successfully receiving each packet. Specifically, the IEEE 802.11 standards require a receiver to provide an acknowledgment signal to a transmitter after receipt of each unicast packet, thereby indicating that the transmitter can transmit the next packet. These acknowledgment (also called ACK) packets can be advantageously used to provide indirect, but valuable information regarding the channel.

Of importance, in a typical WLAN environment, the transmitters of each station would preferably be balanced, i.e. transmitting at the same or substantially the same power (e.g. within 5 dB). This balanced system makes it probable that the ACK packets sent from the receiver to the transmitter would have substantially the same signal strength as the ACK packets sent from the transmitter to the receiver. Therefore, in accordance with one aspect of the invention, when a transmitter receives an ACK packet from a receiver, the transmitter can advantageously assess the received signal strength indicator (RSSI) from that packet. In general, if channel conditions become better, then the RSSI typically increases, whereas if the channel conditions become worse, the RSSI typically decreases. In a typical embodiment, the RSSI of the ACK packet can be reported by the hardware in the status portion of the transmitter's receive descriptor. The transmitter can advantageously use this acknowledgement RSSI (ackRSSI) information in the adaptive rate technique.

In accordance with another aspect of the invention, the packet error rate (PER) can also be used in the adaptive rate technique to adjust a maximum data rate, a probe rate (i.e. when the transmitter attempts to increase throughput by periodically increasing the data rate beyond the maximum data rate for one packet), and the threshold RSSIs for one or more data rates. The packet error rate can be computed by using the following equation:

$$\text{Packet Error Rate} = \frac{\# \text{ Attempts} - \# \text{ Successes}}{\# \text{ Attempts}}$$

Note that as the # Attempts increase, the packet error rate can increase (the exceptions being if # attempts=# successes or if # successes=0). For example, the more retries that are necessary to send a packet, the higher the # Attempts, thereby increasing the packet error rate.

In one embodiment, a lookup table of the minimum RSSI (called an RSSI threshold) required to transmit successfully at each rate and a PER estimate for each rate can be maintained. This lookup table is called a rate control table herein. A networking protocol parameter, UDP rate, can also be stored in the rate control table. UDP (universal data protocol) rate (measured in Mb/s) refers to a "burdened" network throughput. That is, each packet transmission has an associated overhead. This overhead includes waiting for an ACK packet and sending non-data, such as a header, in the packet. Therefore, a UDP rate is less than its associated data rate. Table 1 provides exemplary values for four data rates.

TABLE 1

Exemplary Values For Four Data Rates

| Data Rate (Mbps) | 24 | 36 | 48 | 54 |
|---|---|---|---|---|
| Theoretical UDP Throughput (Mbps) | 17.3 | 23.0 | 27.4 | 29.3 |
| RSSI Threshold (dB) | 17 | 19 | 23 | 28 |
| PER (%) | 40 | 40 | 50 | 50 |

An initialized rate control table (i.e. a table before transmission begins) can include the possible data rates for the transmitter, the theoretical UDP rates for each of those rates, and the RSSI thresholds for each of those rates. The initial RSSI thresholds, computed using simulation or otherwise provided, can be theoretical minimum values. Based on actual transmission information, these RSSI thresholds can be adjusted. However, in one embodiment, the RSSI thresholds cannot be adjusted lower than these theoretical minimum values. In this manner, the RSSI thresholds can reflect channel conditions while still maintaining reasonable thresholds for using the supported data rates. Similarly, because transmission information is initially unavailable, the PERs can also be set to zero, thereby assuming perfect channel conditions.

Note that, in some embodiments, the entries in Table 1 could be included in multiple tables. For example, in one embodiment of a transmitter using 802.11g, information regarding Barker- or CCK-modulated data rates (e.g. 1, 2, 5.5, and 11 Mbps) and OFDM-modulated data rates (e.g. 6, 9, 12, 18, 24, 36, 48, and 54) could be provided in the same table or in different tables.

Figure 2A:
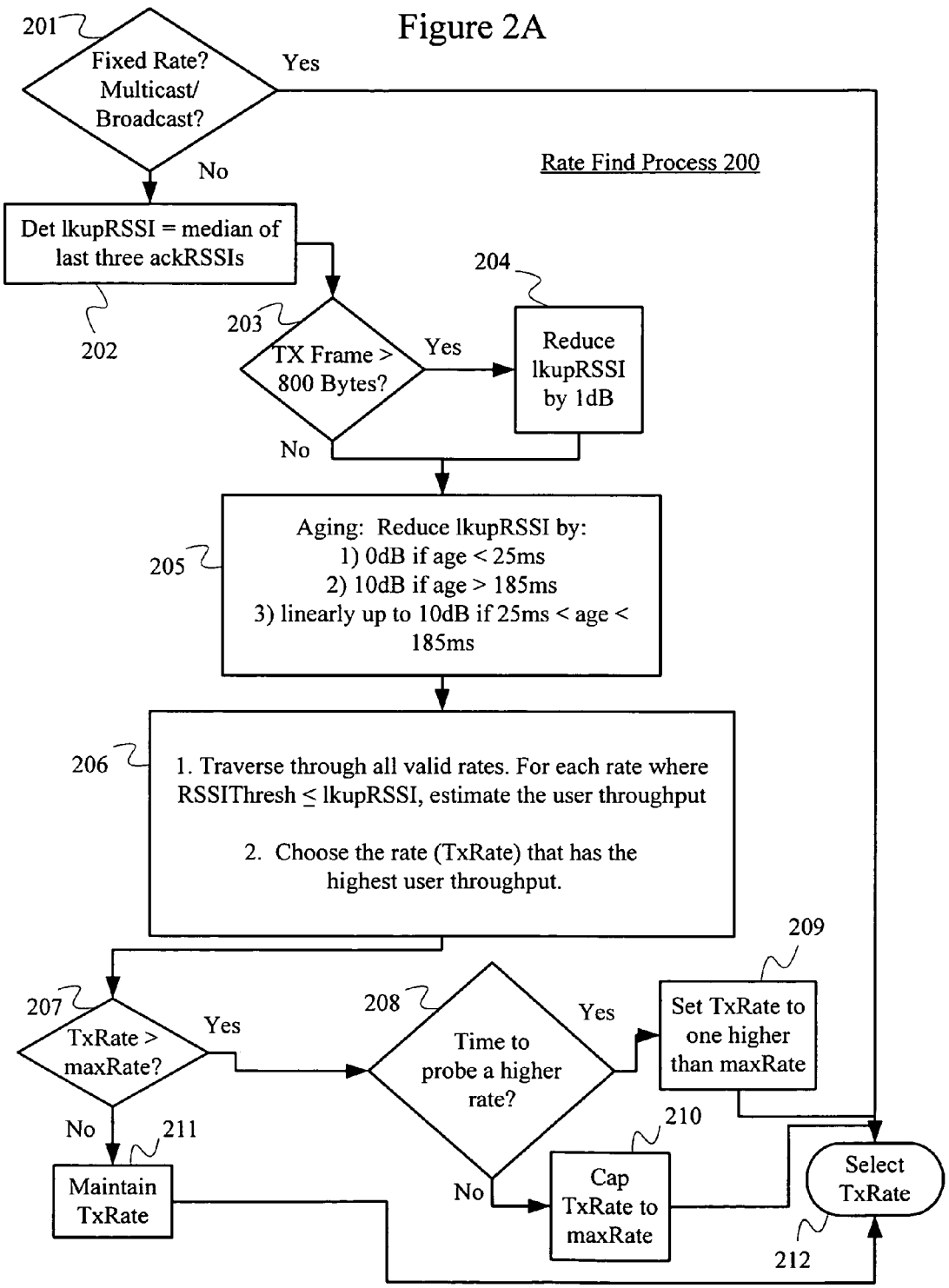
FIG. 2A illustrates a flow chart of an exemplary process for finding an optimum data rate.

FIG. 2A illustrates an exemplary rate find process 200 that can advantageously use the rate control table to quickly adapt the transmission rate based on changing channel conditions. Specifically, if there are changes in the channel conditions (caused by, for example, obstacles or interference), then rate find process 200 can automatically step up or step down to an optimum rate that allows for reliable data transmission at the fastest possible rate.

In this embodiment of rate find process 200, the adaptive rate technique is only applied to unicast traffic. Other types of transmissions, e.g. multicast and broadcast traffic, can be transmitted at the lowest rate to maximize the probability that receiving stations receive each packet. For example, for Barker- or CCK-modulated packets, a data rate of 1 Mbps could be used. Similarly, for OFDM modulated packets, a data rate of 6 Mbps could be used.

Therefore, a step 201 can determine whether a fixed rate or multicast/broadcast transmission applies to a packet. If so, then the data rate is already known and therefore can be immediately selected in step 211. If not, i.e. the packet is provided in a unicast transmission, then step 202 can determine a lookup RSSI.

In one embodiment, the lookup RSSI can be determined by finding the median RSSI of the last three acknowledgement packets' RSSIs. Note that other embodiments could include determining the median, average, minimum, maximum RSSI or similar function using more or less acknowledgment packets. In the case of an odd number of values, the median RSSI would be the middle entry in a list including the RSSIs sorted in increasing order. In the case of an even number of values, the median RSSI would be equal to the sum of the two middle numbers (assuming a sorted list) divided by two. The WLAN transceiver can include memory for storing the appropriate number of ACK packet RSSIs.

Step 203 determines whether the current transmission frame is greater than 800 bytes. If so, thereby indicating that the packet is relatively long, then the lookup RSSI can be reduced by 1 dB and passed to step 205. A stronger signal is required for a better guarantee of transmission success for longer packets because the probability of a packet failure increases with the length of the packet in bits. If the current transmission frame is not greater than 800 bytes, thereby indicating that the packet is relatively short, then the lookup RSSI determined in step 202 is used in step 205.

Step 205 can advantageously bias the lookup RSSI based on when the last ACK packet was sent, i.e. its "age". In one embodiment, the lookup RSSI is not reduced if the last ACK packet was sent less than 25 ms ago. However, if the last ACK packet was sent more than 185 ms ago, then the lookup RSSI can be reduced by 10 dB. If the last ACK packet was sent between 25 ms and 185 ms ago, then the lookup RSSI can be reduced linearly up to 10 dB.

This biasing ensures that "older" ACK packets are given less weight in determining channel conditions than "newer" ACK packets. In other words, if the last ACK packet is "old", thereby indicating that all ACK packets used to determine lookup RSSI are "old", then the channel conditions can be conservatively characterized as probably being worse rather than better. Note that the particular values to determine the aging of the ACK packets (i.e. 25 and 185 ms) can be chosen so as to optimize ease of computation in software for a specific WLAN transceiver. Therefore, these values could vary between different WLAN transceivers. Further note that a linear reduction for an intermediate age ACK packet results in a simple mapping and therefore may also reduce computational complexity.

At this point, step 206 can determine the "valid" rates, i.e. each data rate that has an RSSI threshold less than or equal to the lookup RSSI. For each valid rate, the user throughput can be computed based on its theoretical UDP throughput and its PER. Specifically, the user throughput can be computed using the following equation:

User Throughput=Theoretical UDP Throughput* (1.0−PER)

For example, referring to Table 1 and assuming a lookup RSSI of 25 dB, then the valid data rates are 24, 36, and 48 Mbps (that is, the respective user throughput for these rates is 10.4 (17.3*(1.0−0.40)), 13.8 (23.0*(1.0−0.40)), and 13.7 (27.4*(1.0−0.50)). In accordance with one feature of the invention, the rate that gives the best user throughput can be selected. Therefore, in this example, the data rate of 36 Mbps is selected for transmission, i.e. the TxRate.

In accordance with one feature of the invention, a maximum data rate (maxRate) can also be stored in the WLAN device. This maxRate refers to the maximum currently successful transmission rate that can be used for a regular transmission. In one embodiment, an initial maxRate is set to the highest possible data rate. For example, if the data rates of Table 1 are available as possible data rates, then maxRate can be set to 54 Mbps.

If TxRate is greater than maxRate, as determined in step 207, then step 208 determines whether it is time to probe at a higher data rate. (Note that maxRate can be reduced pursuant to step 226, which is described in reference to FIG. 2B.) In one embodiment, this probing can occur at least every 100 ms for OFDM packets and at least every 200 ms for CCK packets. If it is time to probe, then the TxRate can be set to the next higher data rate than maxRate, if possible (that is, if another higher data rate is available), in step 209. If it is not time to probe (or if another higher data rate is not available), then the TxRate can be capped at the maxRate in step 210. If the TxRate is not greater than maxRate, then the current TxRate is maintained in step 211. The TxRate from the appropriate step, i.e. from steps 209, 210, or 211, is then selected in step 212.

Figure 2B:
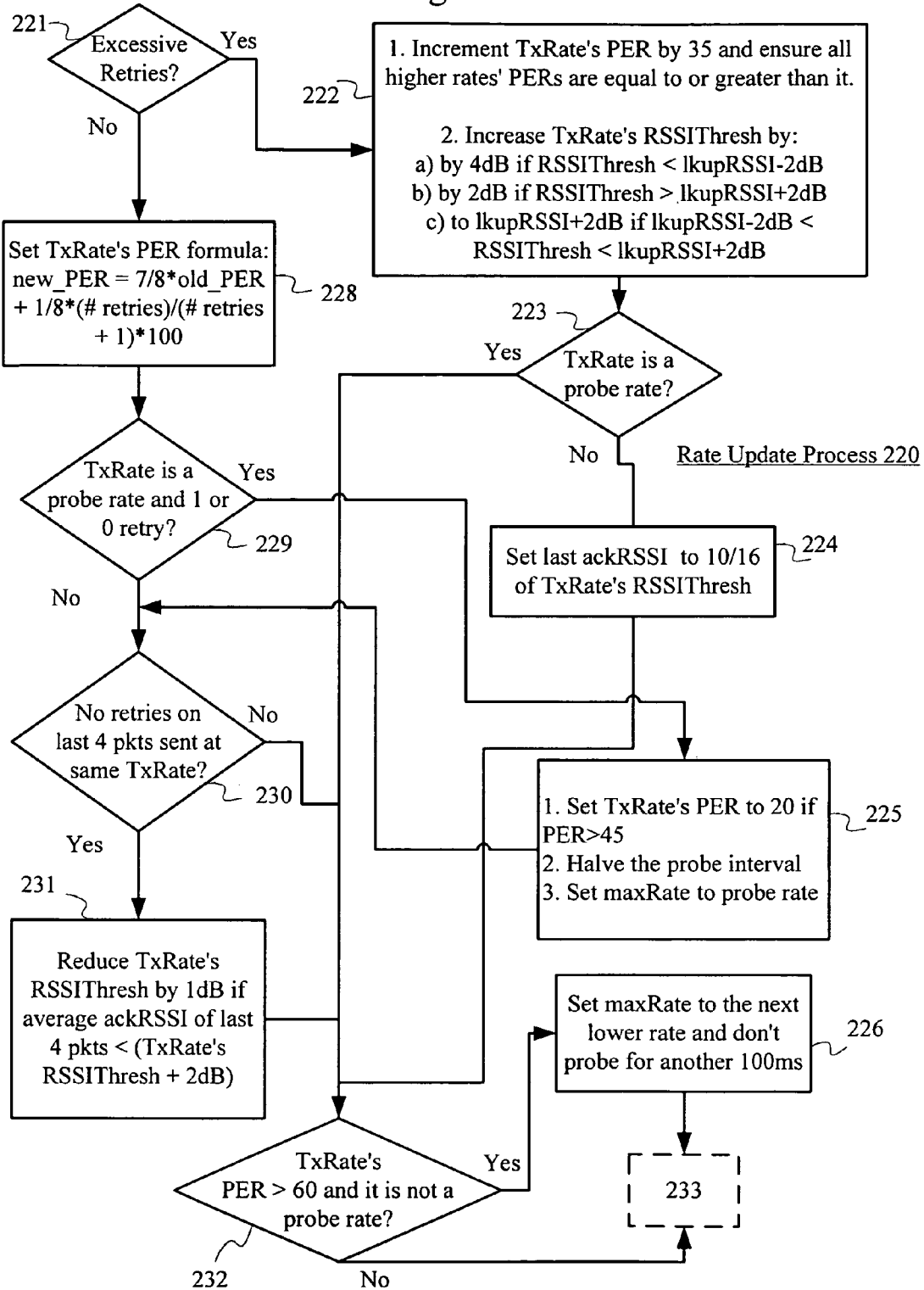
FIGS. 2B and 2C illustrate a flow chart of an exemplary process for updating a rate control table.
Figure 2C:
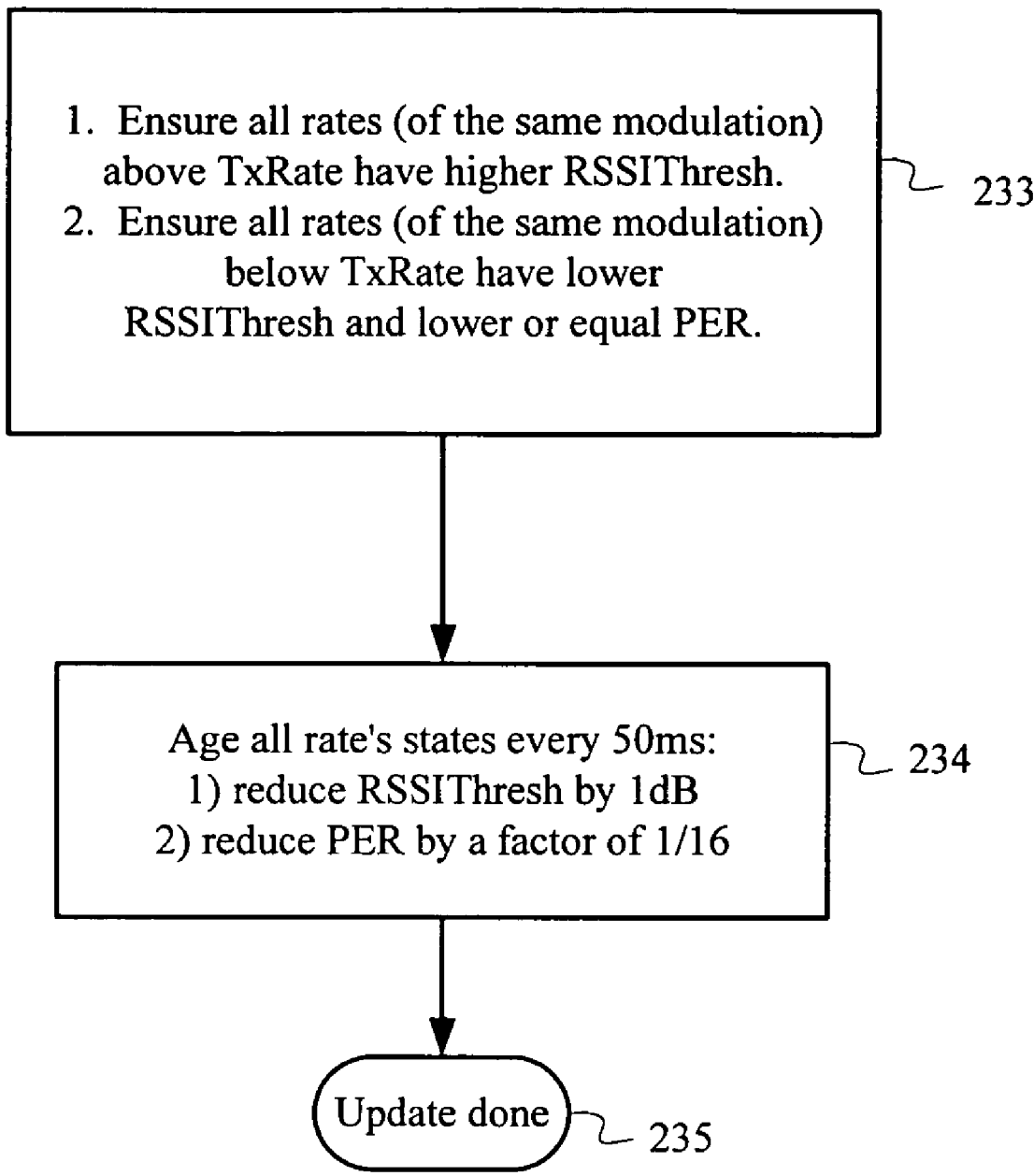

Because changes in multipath might not produce corresponding changes in RSSI, another parameter, i.e. the PER, can also be analyzed as a channel quality indicator. In one embodiment, after the new transmission rate TxRate is selected, the PER can be analyzed during an update of the control rate table. FIGS. 2B and 2C illustrate a rate update process 220 that can update the rate control table while adjusting the maxRate, the probe rate, and/or the RSSI thresholds.

Note that for every attempted transmit of a unicast packet, there are three possible outcomes. In a first outcome, the packet is successfully delivered to the receiver with no retries. An ACK packet from the receiver indicates successful reception. In a second outcome, the packet is successfully delivered to the receiver within a predetermined number of retries. A retry is triggered when no ACK is received from the receiver. Once again, an ACK packet from the receiver indicates a successful reception. In a third outcome, the packet cannot be successfully delivered to the receiver within the predetermined number of retries, i.e. no ACK packet is received from the receiver on any of the retries.

In one embodiment, a maximum number of hardware retries is set to four. In other words, an initial attempt plus 4 retries would result in five packet transmission attempts. This maximum number of hardware retries can be accessed through, for example, a registry setting in the NDIS driver or through a flash setting of the transmitter. Performing five unsuccessful transmissions is characterized as "excessive retries". In rate update process 220, step 221 determines whether the newly selected TxRate results in excessive retries.

If excessive retries are performed, then step 222 increments the PER of the TxRate by 0.35. Because excessive retries cause significant throughput degradation, to avoid immediate subsequent transmission attempts at data rates higher than the TxRate, their PERs can be changed to be at least equal to the newly increased PER of the TxRate. In accordance with one aspect of the invention, the data rates above a TxRate that has resulted in excessive retries should be considered "poisoned", i.e. should not be used. Therefore, step 222 can also increase the RSSI threshold of the TxRate by predetermined increments (thereby raising the threshold for using that data rate) depending on the relationship between that RSSI threshold and the lookup RSSI.

For example, if the RSSI threshold (of the TxRate) is 2 or more dB less than the lookup RSSI, then the RSSI threshold can be increased by 4 dB. If the RSSI threshold is 2 or more dB greater than the lookup RSSI, then the RSSI threshold can be increased by 2 dB. If the RSSI threshold is within 2 dB of the lookup RSSI, then the RSSI threshold can be changed to the lookup RSSI plus 2 dB. Table 2 illustrates these updates to the PERs and the RSSI threshold of the TxRate assuming that using 36 Mbps as the TxRate results in excessive retries. Specifically, the PERs for data rates 36 Mbps, 48 Mbps, and 54 Mbps have been updated to 75% (PER of 36 Mbps+35). Moreover, because the RSSI threshold of 36 Mbps is 6 dB less than the lookup RSSI (i.e. 25 dB), then the updated RSSI threshold would be 19+4=23.

TABLE 2

Table 1 Updated After Step 222

| Data Rate (Mbps) | 24 | 36 | 48 | 54 |
|---|---|---|---|---|
| Theoretical UDP Throughput (Mbps) | 17.3 | 23.0 | 27.4 | 29.3 |
| RSSI Threshold (dB) | 17 | 23 | 23 | 28 |
| PER (%) | 40 | 75 | 75 | 75 |

At this point, step 223 determines whether the TxRate is a probe rate (which could result from steps 208/209, see FIG. 2A). If not, then step 224 sets the RSSI of the last ACK packet (ackRSSI) to 10/16 of the RSSI threshold of TxRate. In other words, an excessive retries condition has just been met, thereby indicating a bad channel condition. Therefore, if an ACK packet had been received (which, in reality, has not been received), it probably would have less power than the last ACK packet. Note that the reduction to 10/16 the RSSI threshold of TxRate is based on empirical data and could vary from one transmitter to another. Resetting the last ackRSSI could affect the analysis associated with determining the TxRate, e.g. step 202 for computing the lkupRSSI.

After the RSSI of the last ACK packet is updated in step 224 or if the TxRate is not a probe rate as determined in step 223, then step 232 determines whether the updated PER of the TxRate is greater than 60 and the TxRate is not a probe rate. If the updated PER of the TxRate is greater than 60 and the TxRate is not a probe rate, then the maxRate can be set to the next lower data rate and probing can be discontinued for a predetermined period of time. In other words, if the PER is deemed to be too great for a non-probe data rate, then the maximum data rate should be decreased. Moreover, under these adverse channel conditions, probing is probably not worthwhile and should be discouraged. In one embodiment, probing can be discontinued for 100 ms.

If excessive retries are not performed, as determined in step 221, then step 228 sets the PER of the TxRate in accordance with the following equation:

$$New\_PER = 7/8 * Old\_PER + 1/8 * [(\#retries)/(\#retries+1)]$$

Note that this is a weighted average of the old PER value and the new PER value based on the most recent packet transmission statistics. This resetting of the PER can advantageously reflect what can be, optimistically, an improving channel condition.

After updating the PER of the TxRate, then step 229 can determine whether the TxRate is a probe rate that has resulted in either 0 or only 1 retry. If so, then step 225 can further reset the PER of TxRate to 20 if PER is currently greater than 45. Step 225 also halves the probe interval and sets maxRate to the probe rate. In other words, if the probe rate results in less than a predetermined number of retries, then channel conditions may have significantly improved and probing should be done more frequently to more quickly adjust the date rate upward to take advantage of such improved channel conditions. Moreover, the new maxRate should be the probe rate, thereby also increasing the probe rate.

If step 229 determines that the TxRate is not a probe rate or is a probe rate that has resulted in less than 2 retries (or following step 225), then step 230 determines whether there were any retries on the last four packets sent at the same TxRate. If so, then the RSSIThresh of the TxRate can be reduced by 1 dB, assuming that the average ackRSSI of the last 4 packets is less than the RSSIThresh of the TxRate+2 dB. Following step 231 or if there were retries on the last 4 packets sent at the same TxRate, then rate update process 220 proceeds to step 232.

After determining that either the updated PER of the TxRate is not greater than 60 or the TxRate is a probe rate (or after adjusting maxRate in step 226), then step 233 (FIG. 2C) can ensure that all rates of the same modulation (i.e. 1, 2, 5.5, and 11 Mbps for Barker/CCK and 6, 9, 12, 18, 24, 36, 48, and 54 Mbps for OFDM) above TxRate have higher RSSI thresholds by at least 1 dB. In one embodiment, the difference between the RSSI thresholds of consecutive data rates must be greater than or equal to a predetermined delta (in dB). The deltas are unique between different consecutive rate pairs, e.g. RSSI thresholds must differ by 1 or more dB between 1 Mbps and 2 Mbps. On the other hand, RSSI thresholds must differ by 3 or more dB between 48 Mbps and 54 Mbps. Step 233 can also ensure that all data rates of the same modulation below the TxRate have lower RSSI thresholds (by the exemplary amounts described above) as well as lower or equal PERs.

Step 234 periodically provides an aging bias on the RSSI thresholds and the PERs in the rate control table. In one embodiment, this aging function can be performed every 50 ms. The aging bias can include reducing the RSSI thresholds by 1 dB and reducing the PERs by a factor of 1/16. Step 235 concludes the update of the rate control table.

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, in one embodiment, adjusting of RSSI thresholds and PERs can be performed for values within the same modulation (e.g. OFDM or Barker/CCK) group. Note that the maxRate adjustment and aging bias can be applied to both modulation groups. In another embodiment including multiple antennas, the WLAN device can switch to the antenna or antenna configuration with the greatest ackRSSI value. In yet another embodiment for a transmitter within an access point (AP), the above-described rate adaptation can be performed independently for each station (STA). Accordingly, a rate control table can be maintained for each station.

In addition to the hardware retries discussed in reference to step 221, the process can further include software retries. A software retry can resend the packet using the next lower data rate and can return to rate find process 200 using the new data rate. In one embodiment, the maximum number of software retries can be set to 4 for an AP and to 6 for a STA. These software retries can use lower rates in an effort to get the packet through. Each software retry can use the same number of hardware retries (e.g. 4 hardware retries, 5 attempts total). If the transmission continues to fail, the packet can be discarded after the final software retry. Note that software retries need to restore the correct packet sequence number to ensure that all retries use the same sequence number. The sequence number can be reported by the hardware in the transmitter descriptor status after the first series fails.

In one embodiment, updating the rate control table takes into account the collisions of the bi-directional data packets inherent in the TCP protocol. That is, the TCP data packets and the TCP-ACK packets can collide because two endpoints are transmitting at the same time. In this embodiment, retries could be penalized less than that described in rate update process 220. For example, in step 228, if the current transmission required 1 retry, then the TxRate's PER is updated using this equation: New_PER=⅞*Old_PER+⅛*[(#retries)/(#retries+1)*½]. For another example, in step 228, if the current transmission required 2 retries, then the TxRate's PER is updated using this equation:

$$\text{New\_PER} = \tfrac{7}{8}*\text{Old\_PER} + \tfrac{1}{8}*[(\#\text{retries}-1)/(\#\text{retries})]$$

Accordingly, it is intended that the scope of the invention be defined by the following Claims and their equivalents.

The invention claimed is:

1. A method of determining a transmission rate (TxRate) for a WLAN transmitter, the method including:
   determining a lookup received signal strength indicator (RSSI) from one or more acknowledgement (ACK) packets;
   determining one or more valid data rates, wherein a valid data rate has an RSSI threshold less than or equal to the lookup RSSI;
   computing an achievable user throughput for each valid data rate by computing a product of a theoretical rate and 1 minus a packet error rate (PER); and
   choosing the valid data rate having a highest achievable user throughput as the TxRate.

2. The method of claim 1, wherein determining the lookup RSSI includes determining a median value of RSSIs from three ACK packets.

3. The method of claim 1, further including:
   determining if a size of a frame to be transmitted is greater than a predetermined value; and
   if the size is greater, then reducing the lookup RSSI by a predetermined amount before determining valid data rates.

4. The method of claim 1, further including:
   biasing the lookup RSSI based on age before determining valid data rates, wherein an older lookup RSSI is reduced more than a more recent lookup RSSI.

5. The method of claim 1, further including determining whether the optimal data rate is greater than a maximum data rate (maxRate),
   wherein if the TxRate is greater than the maxRate, then determining whether a probe rate is appropriate,
   wherein if the probe rate is successful, then resetting the TxRate to one rate higher than the maxRate.

6. The method of claim 5, wherein if the probe rate is not appropriate, then resetting the TxRate to the maxRate.

7. The method of claim 1, further including updating a rate control table.

8. The method of claim 7, wherein updating the rate control table is based on a number of retries to successfully transmit a packet at the TxRate.

9. The method of claim 8, wherein updating the rate control table is further based on whether the TxRate is a probe rate.

10. The method of claim 9, wherein if excessive retries are performed, then updating the rate control table includes adjusting the PER and the RSSI threshold of the TxRate.

11. The method of claim 10, wherein if the TxRate is not a probe rate and the PER is greater than a predetermined value, then
    ensuring that data rates above the TxRate have higher RSSI thresholds than that of the TxRate; and
    ensuring that data rates below the TxRate have lower RSSI thresholds than that of the TxRate as well as PERs less than or equal to the PER of the TxRate.

12. The method of claim 9, wherein if excessive retries are not performed, then updating the rate control table includes computing the PER of the TxRate based on the number of retries.

13. The method of claim 12, wherein if the TxRate is a probe rate and has few retries, then
    resetting the PER of the TxRate;
    significantly reducing a probe interval; and
    setting maxRate to the probe rate.

14. The method of claim 13, wherein if the TxRate is not a probe rate and has no retries on a predetermined number of packets sent at TxRate, then reducing the RSSI threshold of the TxRate.

15. The method of claim 14, wherein if the TxRate is not a probe rate and the PER is greater than a predetermined value, then
    ensuring that data rates above the TxRate have higher RSSI thresholds than that of the TxRate; and
    ensuring that data rates below the TxRate have lower RSSI thresholds than that of the TxRate as well as PERs less than or equal to the PER of the TxRate.

16. The method of claim 7, wherein updating the rate control table includes periodically aging values.

17. The method of claim 16, wherein aging values includes:
    reducing RSSI thresholds by a predetermined amount; and
    reducing PERs by a predetermined factor.

18. A transmission rate for a packet, the transmission rate being computed based on a received signal strength indicator (RSSI) of one or more packets, RSSI thresholds of possible data rates, theoretical universal data protocol (UDP) rate values of the possible data rates, and packet error rates (PERs) of the possible data rates.

19. The transmission rate of claim 18, the transmission rate being further computed based on a size of a frame to be transmitted.

20. The transmission rate of claim 18, the transmission rate being further computed based on an age of multiple packets.

21. A computer readable medium encoded with instructions capable of being executed by a computer for determining a transmission rate (TxRate) in a WLAN transmitter, the instructions comprising:
    a first set of instructions for determining a lookup received signal strength indicator (RSSI) from one or more acknowledgement (ACK) packets;
    a second set of instructions for determining one or more valid data rates, wherein a valid data rate has a stored RSSI value less than or equal to the lookup RSSI;
    a third set of instructions for computing an achievable user throughput for each valid data rate by computing a product of a theoretical rate and 1 minus a packet error rate (PER); and
    a fourth set of instructions for choosing the valid data rate having highest achievable user throughput as the TxRate.

22. The computer readable medium of claim 21, wherein the first set of instructions for determining the lookup RSSI includes instructions for determining a median value of RSSIs from three ACK packets.

23. The computer readable medium of claim 21, further including:
    a fifth set of instructions for determining if a size of a frame to be transmitted is greater than a predetermined value; and
    if the size is greater, then a sixth set of instructions for reducing the lookup RSSI by a predetermined amount before determining valid data rates.

24. The computer readable medium of claim 21, further including:
   a fifth set of instructions for biasing the lookup RSSI based on age before determining valid data rates, wherein an older lookup RSSI is reduced more than a more recent lookup RSSI.

25. The computer readable medium of claim 21, further including a fifth set of instructions for determining whether the optimal data rate is greater than a maximum data rate (maxRate),
   wherein if the TxRate is greater than the maxRate, then the computer-implemented program further comprises a sixth set of instructions for determining whether a probe rate is appropriate,
   wherein if the probe rate is appropriate, then the computer-implemented program further comprises a seventh set of instructions for resetting the TxRate to one rate higher than the maxRate.

26. The computer readable medium of claim 25, wherein if the probe rate is not appropriate, then the computer-implemented program further comprises an eighth set of instructions for resetting the TxRate to the maxRate.

27. The computer readable medium of claim 21, further including a fifth set of instructions for updating a rate control table.

28. The computer readable medium of claim 27, wherein updating the rate control table is based on a number of retries to successfully transmit a packet at the TxRate.

29. The computer readable medium of claim 28, wherein updating the rate control table is further based on whether the TxRate is a probe rate.

30. The computer readable medium of claim 29, wherein if excessive retries are performed, then the fifth set of instructions for updating the rate control table includes instructions for adjusting the PER and the RSSI threshold of the TxRate.

31. The computer readable medium of claim 30, wherein if the TxRate is not a probe rate and the PER is greater than a predetermined value, then the computer-implemented program further comprises:
   a sixth set of instructions for ensuring that data rates above the TxRate have higher RSSI thresholds than that of the TxRate; and
   a seventh set of instructions for ensuring that data rates below the TxRate have lower RSSI thresholds than that of the TxRate as well as PERs less than or equal to the PER of the TxRate.

32. The computer readable medium of claim 27, wherein if excessive retries are not performed, then the fifth set of instructions for updating the rate control table includes instructions for updating the PER of the TxRate based on the number of retries.

33. The computer readable medium of claim 32, wherein if the TxRate is a probe rate and has few retries, then the computer-implemented program further comprises a sixth set of instructions for resetting the PER of the TxRate, significantly reducing a probe interval, and setting maxRate to the probe rate.

34. The computer readable medium of claim 33, wherein if the TxRate is not a probe rate and has no retries on a predetermined number of packets sent at TxRate, then the computer-implemented program further comprises a seventh set of instructions for reducing the RSSI threshold of the TxRate.

35. The computer readable medium of claim 34, wherein if the TxRate is not a probe rate and the PER is greater than a predetermined value, then the computer-implemented program further comprises:
   an eighth set of instructions for ensuring that data rates above the TxRate have higher RSSI thresholds than that of the TxRate; and
   a ninth set of instructions for ensuring that data rates below the TxRate have lower RSSI thresholds than that of the TxRate as well as PERs less than or equal to the PER of the TxRate.

36. The computer readable medium of claim 27, wherein the fifth set of instructions for updating the rate control table includes instructions for periodically aging values.

37. The computer readable medium of claim 36, wherein the instructions for aging values includes:
   instructions for reducing RSSI thresholds by a predetermined amount; and
   instructions for reducing PERs by a predetermined factor.

* * * * *